United States Patent Office 3,552,964
Patented Jan. 5, 1971

3,552,964
PHOTOGRAPHIC VESICULAR MATERIALS AND
IMAGING PROCESS THEREFOR
Norman T. Notley, Pasadena, Calif., and Irwin M.
Senentz, Jr., Metairie, La., assignors to Kalvar Corporation, New Orleans, La., a corporation of Louisiana
No Drawing. Application Aug. 12, 1968, Ser. No.
768,943, which is a continuation of application Ser.
No. 403,633, Oct. 13, 1964. Divided and this application Dec. 31, 1969, Ser. No. 889,735
Int. Cl. G03c 5/34, 1/52, 5/00
U.S. Cl. 96—48
11 Claims

ABSTRACT OF THE DISCLOSURE

Vesicular photographic materials comprising a polymeric vehicle and a light decomposable agent. The polymeric material is a mixture of a resin A and a resin B. By adjusting the relative proportions of these resins, the photographic gamma of the film can be altered. The resin A is an ester or acetal of polyvinyl alcohol. The resin B is an epoxy resin, a phenol formaldehyde resin, a urea-formaldehyde resin, a melamine-formaldehyde resin, a cellulose ester, a silicone resin, an isocyanate resin or a copolymer of maleic anhydride with styrene. Preferably, the amount of resin A is at least 50% and the amount of resin B is up to 50%.

---

This is a division of prior U.S. application Ser. No. 768,943, filed Aug. 12, 1968, now U.S. Pat. No. 3,498,786 which in turn is a continuation of application Ser. No 403,663, filed Oct. 13, 1964, now abandoned.

The present invention relates to photography and, more particularly, to the production of vesicular images.

Vesicular images are formed in a photographic film by small bubbles or vesicles of gas which are formed and trapped in the areas of the film exposed to light and which refract light. Generally speaking, the film has a colloid or a resin coating or vehicle on a backing material and a light-sensitive agent or sensitizer, most commonly a diazo compound, dispersed throughout the coating. When the film is exposed to light, the sensitizer releases molecules of a gas-nitrogen in the case of diazo compounds. These ordinarily do not form vesicles immediately, but they do so when the film is heated, presumably because the vehicle is relaxed sufficiently on heating for the gas molecules to diffuse together into bubbles and for the bubbles to expand. The resulting vesicles make the vehicle opaque to transmission of light in the exposed areas and also reflect and scatter light so that they appear white.

Vesicular photographic materials have been of only limited use in certain applications because of lack of flexibility in the gray scale, or photographic gamma, they possessed. That is, in general it is desirable to reduce the contrast or gamma of light-scattering photographic materials, while in other cases it may be desirable to increase the gamma. It has been known to reduce the photographic gamma while reducing the maximum obtainable density. However, the resultant loss of density range limits the usefulness of this technique.

It also is known to reduce the photographic gamma by treating a vesicular photographic material in a heated aqueous fluid, as is more fully described in U.S. Pat. 3,149,971. This procedure gives good results. However, there is a need for other techniques which avoid the additional process step required.

It is an object of the present invention to provide, in an improved vesicular photographic film, means for adjusting the photographic gamma of the film in which the vehicle is comprised of a blend of two resins to be designated further herein as resin A and resin B. Resin A is a polymer containing an ester or acetal derivative of polyvinyl alcohol; resin B is taken from the group consisting of epoxy resins, phenol formaldehyde resins, urea formaldehyde resins, melamine-formaldehyde resins, cellulose esters, such as cellulose acetate butyrate and cellulose nitrate, silicone resins, isocyanate resins, and copolymers of styrene and maleic anhydride.

The ester derivatives are generally obtained by polymerization of esters of vinyl alcohol with aliphatic or aromatic carboxylic acids. The aliphatic acids are preferred, the most suitable being lower fatty and unsaturated acids containing up to about six carbon atoms, such as acetic acid, propionic acid, valeric acid, vinyl acetic acid or crotonic acid. However, higher fatty acids such as octanoic may be used, particularly in combination with lower fatty acids. Suitable aromatic acids include benzoic acid, naphthoic acids and phenyl acetic acid. The ester polymers may be obtained from the monomer by any conventional polymerization method, i.e., bulk, solution or aqueous emulsion or dispersion, in the presence of, e.g., a free radical or ionic catalyst, the details of which form no part of the present invention.

Polyvinyl acetals are generally made by reaction between aldehydes and polyvinyl alcohol or polyvinyl esters such as polyvinyl acetate. It is preferred that saturated lower aliphatic aldehydes be employed containing up to six carbon atoms, particularly butyraldehyde and formaldehyde. However, small amounts of higher aliphatic aldehydes or aromatic aldehydes such as benzaldehyde may be included. The polyvinyl acetal polymers may contain small amounts of residual hydroxyl groups which have not been converted to the acetal derivative, or of acetate groups which have not been converted to hydroxyl. However, no more than about 60% of the hydroxyl groups, and preferably no more than 25% should remain as free hydroxyl groups, i.e., not converted to a derivative thereof.

It will be appreciated that while the above description of preferred polymers has been directed to homopolymers, copolymers containing more than one acetal, or ester group may be used. Thus polyvinyl acetals may contain two or more types of acetal groups or, e.g., acetate units as well as acetal. In addition, relatively minor amounts of other ethylenically unsaturated monomers containing one or more $>C=C<$ groups may be copolymerized, e.g., up to about 5%, as long as the characteristics of the polymer are essentially not altered so as to render it unsuitable.

Epoxy resins which may be used preferably are glycidyl ethers of polyhydric phenols derived by reaction of a polyhydric phenol with epichlorohydrin. For example, one may use the glycidyl ethers of bis phenol A having the formula

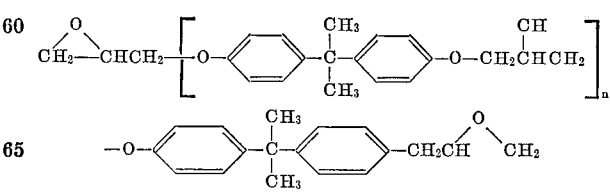

where $n$ is a number up to about 10–15. In place of bis phenol A, other suitable epoxy resins may be based upon mononuclear di- and trihydroxy phenols and other polynuclear polyhydroxy phenols, such as resorcinol, hydroquinone, pyrocatechol, phloroglucinol, bis phenol F, 2,4-4'-trihydroxydiphenyl dimethyl methane, 4,4'-dihydroxy biphenyl, and the like. In addition, one may use expoxidized unsaturated oils, as described more fully in the Encyclopedia of Chemical Technology, Second Supplement Volume (1960) and other epoxide group-containing materials. However, the glycidyl ethers of bis phenol A are preferred and are readily available commercially.

Phenolic, urea or melamine resins which are used are condensates of a phenol, e.g., phenol and p-alkyl phenols, melamine or urea with formaldehyde. A wide variety of these materials are known and commercially available. For example, detailed descriptions may be found in the Encyclopedia of Chemical Technology, volume 1 (1947) pages 741–769, and volume 10 (1953) pages 335–368.

The styrene maleic anhydride copolymer may be prepared by any copolymerization system known for these monomers, e.g., bulk, solution or emulsion polymerization in the presence of a catalyst. Lower molecular weight materials are desirable from the standpoint of compatibility and solubility, but higher molecular weight resins also may be used.

The isocyanate resins are isocyanate-ended prepolymers derived by reaction of an excess of polyisocyanate such as tolylene diisocyanate or p,p'-diisocyanatodiphenylmethane with a polyester, polyether or a polyesteramide. Such materials normally are used with additional amounts of polyester, polyether or polyesteramide, and with or without water, in the making of polyurethanes. They are described in prior U.S. patents and in "Polyurethanes, Chemistry and Technology" by Saunders and Frisch and "Polyurethanes" by Bernard A. Dombrow.

The silicone resins, as are known, are polymers in which the repeating units have the formula $$RnSiO_{4-n}$$

In which R may be alkyl, preferably lower alkyl, e.g., methyl or ethyl, aryl, e.g., phenyl, tolyl, xylyl or naphthyl, aralkyl, e.g., benzyl, alkenyl, e.g., vinyl or allyl, or cycloalkyl, e.g., cyclohexyl. Other groups which may be attached to the silicon atom are hydrogen, —ONa, —OK, or —OR where R has the same meaning as above. As will be appreciated, depending on the value of "n" in the above formula, the silicone may be linear, branched or cross-linked. For the most part, silicones which are linear or slightly branched but not extensively cross-linked are preferred because these tend to be more soluble in the organic solvents used in making films. Suitable examples are polysiloxanes, having repeating units of the general formula

with end groups such as

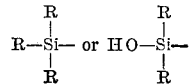

where R is methyl, ethyl, propyl or vinyl. Detailed descriptions of such polymers may be found, for example, in "The Encyclopedia of Chemical Technology," vol. 12, page 393 and "An Introduction to the Chemistry of the Silicones" by E. G. Rochow, 2d. ed., 1951.

The resins A and B are suitably blended by dissolving in a mutual solvent or by dissolving them in separate solvents and mixing the solution together. The resulting resin solution is mixed with the sensitizer, preferably first dissolved in a separate solution, and the resulting mixed solution is coated on a substrate and dried, for example, by heating in an oven at 240° F. It will be observed that some of the resins B may be capable of reacting with acetate, hydroxy or acetal groups of resin A. Consequently, a certain amount of cross-linking may take place, e.g., during this drying step.

After the film is thus prepared, there are at least three different methods of processing it. In one form, the film is exposed to image-forming light, e.g., by being placed in contact with a transparency and exposed to light passing through the transparency. Then, the film is heated to 160°–300° F. for 1/10 to 3 seconds. This will produce an image of the opposite photographic sign from the transparency. Thus if the transparency is a negative, a positive vesicular photograph will result.

A second processing system which can be used is first described in U.S. Pat. No. 2,911,299. In it, the film is exposed to image-forming light and gas released by the sensitizer is allowed to diffuse from the vehicle at a temperature too low for development to take place. Then the film is exposed overall to uniform light, which activates undecomposed sensitizer, and is heated to cause development at 160°–300° F. for 1/10 to 3 seconds, either during or shortly after the second exposure, but before the gas has substantially diffused from the film. This results in image formation in areas not originally struck by light and an image of the same photographic sign as the transparency. Thus a negative transparency results in formation of a negative vesicular photograph which might be called a reversal image or direct image.

The third processing system is that described in U.S. Pat. No. 3,457,071. In that system, the film is exposed to image forming light of relatively low intensity for at least about 0.5 second and preferably for at least about 2.0 seconds. That is, the light is of low enough intensity that the film does not receive a normal exposure in less than 0.5 second and preferably 2.0 seconds. Then the film receives an overall exposure of light intensity which is sufficient to expose the film in less than 0.2 second and preferably less than 0.01 second. Overexposure or longer exposure can be tolerated, but there must be sufficient light to properly expose the film during the indicated time. This procedure avoids a separate diffusion step as used in the method of U.S. Pat. No. 2,911,299. In some cases, no heating is required to cause development, and the image appears spontaneously. However, in other cases, some heating may be used to advantage, as more fully described in U.S. Pat. No. 3,457,071.

Any suitable substrate may be employed for the photographic materials. For films, the preferred materials are films of Mylar (polyethylene terephthalate), polyethylene and polypropylene. Paper backings, metal plates and glass slides also are useful for certain applications. Thus, while films are referred to herein, it will be understood that the invention embraces any backing layer.

It has been found that by mixing resins A and B in different proportions it is possible to adjust the photographic gamma of the films and frequently to increase the photographic density. As the amount of the resin B is increased, the degree of change of photographic gamma will generally increase accordingly. The exact proportions used will, of course, vary according to the desired result. For any given pair of resins, it is possible to determine the effect of changes in proportions by making films from them and determining the value of gamma by conventional sensitometry. A graph is then made in which gamma is plotted as a function of composition, which permits selecting the exact composition for any desired value of gamma. However, in general, the amounts of the resins will fall within the ranges 100 to 50% resin A and 0 to 50% resin B. It also has been found that alterations in the relative amounts of resins A and B change the photographic speed and projection density of the film. In general film speed increases when the contrast is reduced, in a manner somewhat analogous to commercially available silver halide films.

The following examples illustrate the practice of the invention, all parts being by weight.

EXAMPLE I

The following constituents were combined with stirring to form a solution:

| | Parts |
|---|---|
| Butyraldehyde polyvinyl acetal (80% acetal, 0–2.5% acetate, 17.5–21.0% hydroxyl) | 25 |
| General Electric methylon 75–108 | 5 |
| 1,4 dioxane | 200 |
| p-Diazo N,N-dimethyl aniline zinc chloride salt | 4 |
| Acetonitrile | 80 |

Methylon 75–108 has the formula

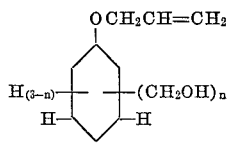

Where $n = 1-3$.

The solution was applied to a backing layer of Mylar film and dried. Then the film was exposed to light from a 500 watt tungsten filament incandescent lamp spaced about 3 inches from the film through an image bearing transparency for twenty seconds and developed by heating for two seconds at 240° F.

An image was obtained which showed a maximum projection density of 2.74.

EXAMPLE II

The following constituents were carefully mixed in an open vessel with stirring continued until a uniform solution was obtained.

| | Parts |
|---|---|
| Formaldehyde polyvinyl acetal (50% acetal, 40–50% acetate, 5.0–6.5% hydroxyl) | 25 |
| SMA 400A [1] | 5 |
| 1,4-dioxane | 100 |
| p-Diazo N,N-dimethylaniline zinc chloride salt | 4 |
| Acetonitrile | 80 |

[1] A copolymer of styrene and maleic anhydride which is a dry powder, has a molecular weight of 700, a melting range of 50–70° C., an acid number of 415, a specific gravity at 30° C. (10 gms., 100 ml. acetone) of 0.53, a bulk density of 37.9 lbs./ft.³ and a true density of 76.4 lbs./ft.³.

The resultant solution was coated on a glass plate which was dried, exposed to light through an image bearing transparency and developed as in Example I. The image showed a maximum projection density of 2.68.

EXAMPLE III

Example II was repeated using as the constituents of the solution:

| | Parts |
|---|---|
| Butyraldehyde polyvinyl acetal (88 acetal, 0–2.5 acetate, 9–13.0% hydroxy) | 25 |
| Resimene 881 [1] | 5 |
| 1,4-dioxane | 100 |
| p-Diazo N,N-dimethyl aniline zinc chloride salt | 4 |
| Acetonitrile | 80 |

[1] A melamine formaldehyde resin composition Type III, 60±2% solids with 20% butanol and 20% xylol having an acid number less than 1 (mg. KOH to neutralize 1 g. resin solids) and a viscosity L–P (Gardner-Holt bubble tube standard at 25° C.).

The image showed a maximum projection density of 2.76.

EXAMPLE IV

Example II was repeated, using as the constituents of the solution:

| | Parts |
|---|---|
| Formaldehyde polyvinyl acetal (82% acetal, 9.5–13.0% acetate, 5.0–6.5% hydroxyl) | 25 |
| SR–82 [1] | 5 |
| 1,4-dioxan | 100 |
| p-Diazo N,N-dimethyl aniline zinc chloride salt | 4 |
| Acetonitrile | 80 |

[1] A silicone resin available as an uncatalyzed, light straw-colored solution in xylol containing 60±1% solids, having a specific gravity of 1.06 and a viscosity of 5–30 cps. (Gardner-Holt).

The image obtained showed a maximum projection density of 2.58.

EXAMPLE V

The following materials were combined in 80 parts of acetonitrile to form a solution:

| | Parts |
|---|---|
| Butyraldehyde polyvinyl acetal (80% acetal, 0–2.5% acetate, 18.0–20% hydroxyl) | 25 |
| Mondur S | 5 |
| 1,4-dioxane | 180 |
| p-Diazo N,N-dimethyl aniline zinc chloride salt | 4 |

Mondur S is a light-colored, stabilized polyisocyanate adduct known for use with polyester resins in the formulation of bake-type one-component room temperature-stable urethane coatings. It has a specific gravity of 1.26–1.28, a total solids content of about 95%, available NCO, 11.5–13.5% and a softening point of 80–120° C.

The resultant solution was coated on a thin film of Mylar and dried in an oven at 240° F. for 5 minutes. The dried film was placed in contact with a microfilm transparency and exposed to light through the transparency from a mercury arc lamp (General Electric H100–A4 IT) spaced 2 inches away for 20 seconds. The film was then developed by heating to 240° F. for two seconds.

An image was obtained which showed a maximum projection density of 2.47.

In the following examples, solutions were prepared from the constituents indicated and films were made as described in Example I. Then the films were exposed and developed as also described in Example I.

EXAMPLE VI

| | Parts |
|---|---|
| Butyraldehyde polyvinyl acetal (80% acetal, 0–1.0% acetate, 18.0–20.0% hydroxyl) | 25 |
| Araldite 6097 [1] | 5 |
| 1,4-dioxane | 250 |
| p-Diazo N,N-dimethyl aniline zinc chloride salt | 4 |
| Acetonitrile | 80 |

[1] A bis phenol A-epichlorohydrin condensate by Ciba having a melting point of 130, an epoxide equivalent of 1,785, and a viscosity at 25° C. (Gardner-Holt) of Z.1.

The image obtained showed a maximum projection density of 3.00.

EXAMPLE VII

| | Parts |
|---|---|
| Formaldehyde polyvinyl acetal (82% acetal, 9.5–13.0% acetate, 5.0–6.0% hydroxyl) | 25 |
| Uformite F–240 [1] | 5 |
| 1,4-dioxane | 120 |
| p-Diazo N,N-dimethyl aniline zinc chloride salt | 4 |
| Acetonitrile | 80 |

[1] A urea-formaldehyde resin available in clear, colorless form as 60±2% solids in xylol-butanol (1:1½) having an acid number solids basis 3–8, specific gravity 1.02, pounds per gallon 8.5, viscosity (Gardner-Holt at 25° C.) L–Q, mineral thinner tolerance 50 min.

The image obtained had a maximum projection density of 2.75.

EXAMPLE VIII

| | Parts |
|---|---|
| Formaldehyde polyvinyl acetal (70% acetal, 22–30% acetate, 5.5–7.0% hydroxyl) | 20 |
| Cellulose acetate butyrate | 6 |
| 1,4-dioxane | 200 |
| p-Diazo N,N-dimethyl aniline zinc chloride salt | 4 |
| Acetonitrile | 40 |

The image obtained showed a maximum projection density of 2.34.

EXAMPLE IX

| | Parts |
|---|---|
| Butyraldehyde polyvinyl acetal (80% acetal, 0–2.5% acetate, 17.5–21.0% hydroxyl) | 25 |
| Nitrocellulose (RS) | 3 |
| 1,4-dioxane | 200 |
| Methyl ethyl ketone | 20 |
| p-Diazo N,N-dimethyl aniline | 4 |
| Acetonitrile | 40 |

The image obtained showed a maximum projection density of 2.74.

Ethyl cellulose can be used in place of nitrocellulose in the above formulation.

EXAMPLE X

To illustrate the effect of varying amounts of resins A and B, three films were made accordding to the method of Examples VI–IX using the following:

(1)

| | Parts |
|---|---|
| Polyvinyl formal | 100 |
| Dioxane | 480 |
| Dimethyl amino benzene diazonium chloride, boron trifluoride stabilized | 16 |
| Acetonitrile | 320 |

(2)

| | Parts |
|---|---|
| Polyvinyl formal | 100 |
| Epon 1001 [1] | 20 |
| Dioxane | 480 |
| Dimethyl amino benzene diazonium chloride, boron trifluoride stabilized | 16 |
| Acetonitrile | 320 |

(3)

| | Parts |
|---|---|
| Polyvinyl formal | 100 |
| Epon 1001 | 30 |
| Dioxane | 480 |
| Dimethyl amino benzene diazonium chloride, boron trifluoride stabilized | 16 |
| Acetonitrile | 320 |

[1] Epon 1001 is an epichlorohydrin bis phenol A type epoxy resin having a melting point of 64–76° C., an epoxide equivalent of 450–525, an average molecular weight of 900–1000 and a viscosity of 25° C. (Gardner-Holt) C–G.

Samples of the respective films were exposed on a sensitometer and developed at 240° F. to make a copy of the step wedge of reversed photographic sign. The following results were obtained.

(1) projection density (f/5 aperture) of 2.0
(2) projection density (f/5 aperture) of 2.46
(3) projection density (f/5 aperture) of 2.7

The photographic contrast (gamma) decreased and the photographic speed increased progressively from sample 1 through 3.

EXAMPLE XI

The following formulation was used following the method of Example I:

| | Parts |
|---|---|
| Gelva (M–7, V100R) (polyvinyl acetate copolymer) | 25 |
| Methyl ethyl ketone | 95 |
| Distilled water | 5 |
| General Electric Methylon 75–108 | 4 |
| p-Diazo N,N-dimethyl aniline zinc chloride salt | 4 |
| Acetonitrile | 40 |

The following three formulations were used in making and using films, following the method of Example I:

EXAMPLE XII

| | Parts |
|---|---|
| Gelva V–60 | 25 |
| Epon 1001 | 5 |
| Methyl ethyl ketone | 100 |
| p-Diazo N,N-dimethyl aniline zinc chloride salt | 4 |
| Acetonitrile | 40 |

Gelva V–60 is a homopolymer of vinyl acetate supplied in the form of granules whose viscosity is 54–66 cps. in benzene solution containing 86 grams of resin per 1000 ml. of solution, determined at 20° C. with an Ostwald-Cannon-Fenske viscometer, molecular weight (wt. av.) is 300,000, softening point is 385° F. (determined by a modified Kraemer and Sarnow method using 10 grams of mercury over a 6.35 mm. cylindrical plug of Gelva Resin in a 7 mm. diameter glass tube), heat seal temperature is 185–195° C. (the minimum temperature required for heat sealing of a 1–1.5 mil (dry) film cast from methanol solution on ditto paper dried at room temperature for 45 minutes, then force dried for one hour at 70° C. conditioned for 16 hours at 73° F., 50 percent R.H., using a PACK-RITE 1.5 sec. dwell, 10 p.s.i. pressure, on 4" x ¾" sample, face to face), maximum tensile strength is 6500 p.s.i. (molded specimens—2⅜" gauge x ¼" x 0.07"—conditioned 48 hours at 73° F., 50% R.H. Instron Tester at 2 in./min. crosshead speed) percent elongation at yield is 4.8, abrasion resistance is 59 mg. weight loss (Taber abrasion in mg. loss/1000 revs on cast film conditioned 48 hours at 73° F., 50% R.H., C–10 wheels—1000 gm. load), and second order transition temperature is 27° C.

EXAMPLE XIII

| | Parts |
|---|---|
| Gelva V–100 | 25 |
| General Electric Methylon 75–108 | 5 |
| Methyl ethyl ketone | 100 |
| p-Diazo N,N-dimethyl aniline zinc chloride salt | 4 |
| Acetonitrile | 40 |

Gelva V–100 is a homopolymer of vinyl acetate supplied in the form of granules whose properties, determined by the methods stated for Gelva V;60 are as follows: viscosity, 90–110 cps.; molecular weight, 500,000; softening point, 446° F.; heat seal temperature, 195–205° F.; maximum tensile strength, 7200 p.s.i.; percent elongation at yield, 4.6; abrasion resistance, 64 mg. weight loss; second order transition temperature, 28° C.

EXAMPLE XIV

| | Parts |
|---|---|
| Gelva V–800 | 25 |
| Uformite F–240 | 5 |
| Methyl ethyl ketone | 100 |
| p-Diazo N,N-dimethyl aniline zinc chloride salt | 4 |
| Acetonitrile | 40 |

Gelva V–800 is a homopolymer of vinyl acetate supplied in the form of granules whose properties, determined by the methods stated in Example XII for Gelva V–60 are as follows: viscosity, 700–1000 cps.; molecular weight, about $1.5 \times 10^6$; heat seal temperature, 205–215° F.; maximum tensile strength, 7300 p.s.i.; percent elongation at yield, 4.3; abrasion resistance, 59 mg. weight loss; second order transition temperature, 29° C.

As can be seen from the foregoing, the vesicular photographic films described herein provide a useful means for controlling sensitivity and the value of gamma. In addition, in the images obtained, the bubbles can be made very small, thereby improving resolution and the bubbles have unusually high stability. Thus it can be seen that these films have many important advantages and achieve the objects of the invention.

The invention has now been described with respect to preferred embodiments, but it will be appreciated that various changes may be made in the materials used and the details of the processes, and that no limitation thereto is intended, except as the invention is defined in the appended claims. Thus, for example, while particular sensitizers are described in the foregoing examples, any light decomposable solid agent of the type known in vesicular photography may be used, if it is of the type which, upon exposure to light, decomposes into products which are volatile upon warming to form the above-described radiation-scattering discontinuities. The preferred sensitizers are non-reactive to the vehicle and, upon exposure to light, decompose into products which are chemically non-reactive to said vehicle and which are volatile to form radiation-scattering discontinuities only in the light struck areas in said vehicle to thereby furnish a record. Of the preferred sensitizers, those which are especially useful on exposure to light, particularly the diazonium salts. Full descriptions of these sensitizers may be found, for example, in U.S. Pat. 3,457,071, and the prior patents referred to therein, any of the sensitizers disclosed in said patent being usable herein.

Similarly other changes may be made in the process such as the kind of light source used, the conditions of development, and the like, within the scope of the invention, since the examples herein are provided only for the purpose of illustration.

What is claimed is:

1. A photographic material capable of furnishing a record solely in the form of a distribution pattern of radiation-scattering discontinuities formed within an otherwise substantially homogeneous vehicle, said material being in the form of a dry, water-resistant film, the continuous phase of said film being essentially a synthetic, water-insoluble, non-water swelling mixture of a resin A and a resin B, said mixture containing at least 50% by weight of resin A, said resin A being a polyvinyl alcohol in which at least 40% of the hydroxyl groups are in the form of a member of the group consisting of acetals, with aldehydes containing up to about six carbon atoms and esters with an organic carboxylic acid selected from the class consisting of aliphatic carboxylic acids containing up to about six carbon atoms, mixtures thereof with higher aliphatic carboxylic acids, benzoic acid, naphthoic acid and phenyl acetic acid, and said resin B being an isocyanate resin which is an isocyanate-ended prepolymer derived by reaction of an excess of a polyisocyanate with a polyester, polyether or polyesteramide, and a light democposable solid agent substantially uniformly dispersed therein as the sole essential decomposable agent, said decomposable agent itself being non-reactive to said vehicle and upon exposure to light decomposing into products which are chemically non-reactive to said vehicle and which are capable upon warming of forming said rediation-scattering discontinuities only in the light struck areas in said vehicle to thereby furnish said record.

2. A photographic material as set forth in claim 1 in which the amount of said resin A is less than 100% but at least 50% by weight of the total weight of resin A and resin B and the amount of said resin B is up to 50% by weight of said total weight.

3. A photographic material as set forth in claim 1 in which said resin A is butyraldehyde polyvinyl acetal.

4. A photographic material as set forth in claim 1 in which said resin A is formaldehyde polyvinyl acetal.

5. A photographic material as set forth in claim 1 in which said resin A is a polyvinyl ester which is an ester of polyvinyl alcohol with an organic carboxylic acid.

6. A method of producing a vesicular image which comprises, exposing to image forming light a vesicular photographic material capable of furnishing a record solely in the form of a distribution pattern of radiation-scattering discontinuities formed within an otherwise substantially homogeneous vehicle, said material being in the form of a dry, water-resistant, non-water swelling film, the continuous phase of said film being essentially a synthetic, water-insoluble, non-hygroscopic, non-water swelling mixture of a resin A and a resin B, said mixture containing at least 50% by weight of resin A, said resin A being a polyvinyl alcohol in which at least 40% of the hydroxyl groups are in the form of a member of the group consisting of acetals with aldehydes containing up to about six carbon atoms and esters with an organic carboxylic acid selected from the class consisting of alphatic carboxylic acids containing up to about six carbon atoms, mixtures thereof with higher aliphatic carboxylic acids, benzoic acid, naphthoic acid and phenyl acetic acid and said resin B being an isocyanate resin which is an isocyanate-ended prepolymer derived by reaction of an excess of a polyisocyanate with a polyester, polyether or polyesteramide, and a light decomposable solid agent substantially uniformly dispersed therein as the sole essential decomposable agent, said decomposable agent itself being non-reactive to said vehicle and upon exposure to light decomposing into products which are chemically non-reactive to said vehicle and which are capable upon warming of forming said radiation-scattering discontinuities only in the light struck areas to thereby furnish said record, and thereafter heating said photographic material to cause development.

7. A method as set forth in claim 6 in which the amount of said resin A is less than 100% but at least 50% by weight of the total weight of resin A and resin B and the amount of said resin B is up to 50% by weight of said total weight.

8. A method as set forth in claim 6 in which said resin A is formaldehyde polyvinyl acetal.

9. A method as set forth in claim 6 in which said resin A is butyraldehyde polyvinyl acetal.

10. A method as set forth in claim 6 in which said resin A is a polyvinyl ester which is an ester of polyvinyl alcohol with an organic carboxylic acid.

11. A method of producing a vesicular image which comprises, exposing to image forming light a vesicular photographic material capable of furnishing a record solely in the form of a distribution pattern of radiation-scattering discontinuities formed within an otherwise substantially homogeneous vehicle, said material being in the form of a dry, water-resistant, non-water swelling film, the continuous phase of said film being essentially a synthetic, water-insoluble, non-hygroscopic, non-water swelling mixture of a resin A and a resin B, said mixture containing at least 50% by weight of resin A, said resin A being a polyvinyl alcohol in which at least 40% of the hydroxyl groups are in the form of a member of the group consisting of acetals, with aldehydes containing up to about six carbon atoms and esters with an organic carboxylic acid selected from the class consisting of aliphatic carboxylic acids, containing up to about six carbon atoms, mixtures thereof with higher aliphatic carboxylic acids, benzoic acid, naphthoic acid and phenyl acetic acid and said resin B being an isocyanate resin which is an isocyanate-ended prepolymer derived by reaction of an excess of a polyisocyanate with a polyester, polyether or polyesteramide, and a light decomposable solid agent substantially uniformly dispersed therein as the sole essential decomposable agent, said decomposable agent itself being non-reactive to said vehicle and upon exposure to light decomposing into products which are chemically non-reactive to said vehicle and which are capable upon warming of forming said radiation-scattering discontinuities only in the light struck areas to thereby furnish said record, diffusing said volatile products from said vehicle without forming an image therein, subjecting said vehicle to substantially uniform irradiation to cause decomposition of an additional quantity of said decomposable agent, and heating said photographic material to cause development and the formation of a vesicular image.

References Cited

UNITED STATES PATENTS

| | | | |
|---|---|---|---|
| 3,032,414 | 5/1962 | James et al. | 96—49X |
| 3,081,169 | 3/1963 | Parker et al. | 96—49X |
| 3,143,418 | 8/1964 | Priest et al. | 96—91X |
| 3,190,844 | 6/1965 | Milone et al. | 260—2.5 |
| 3,208,850 | 9/1965 | Daech | 96—75UX |
| 3,244,523 | 4/1966 | Growald et al. | 96—91X |
| 3,260,599 | 7/1966 | Lokker | 96—49X |

NORMAN G. TORCHIN, Primary Examiner

CHARLES L. BOWERS, JR., Assistant Examiner

U.S. Cl. X.R.

96—49, 67, 88, 91, 115

UNITED STATES PATENT OFFICE
CERTIFICATE OF CORRECTION

Patent No. 3,552,964    Dated Jan. 5, 1971

Inventor(s) Norman T. Notley, et al.

It is certified that error appears in the above-identified patent and that said Letters Patent are hereby corrected as shown below:

Delete from the heading in Column 1 the words:

"assignors to Kalvar Corporation, New Orleans, La., a corporation of Louisiana"

Signed and sealed this 20th day of June 1972.

(SEAL)
Attest:

EDWARD M. FLETCHER, JR.
Attesting Officer

ROBERT GOTTSCHALK
Commissioner of Patent